(12) United States Patent
Dubrovin et al.

(10) Patent No.: US 8,892,621 B2
(45) Date of Patent: Nov. 18, 2014

(54) IMPLEMENTATION OF NEGATION IN A MULTIPLICATION OPERATION WITHOUT POST-INCREMENTATION

(75) Inventors: Leonid Dubrovin, Karney Shomron (IL); Alexander Rabinovitch, Kfar Yona (IL)

(73) Assignee: LSI Corporation, Milpitas, CA (US)

( * ) Notice: Subject to any disclaimer, the term of this patent is extended or adjusted under 35 U.S.C. 154(b) by 430 days.

(21) Appl. No.: 13/330,436

(22) Filed: Dec. 19, 2011

(65) Prior Publication Data

US 2013/0159367 A1    Jun. 20, 2013

(51) Int. Cl.
*G06F 7/533*    (2006.01)

(52) U.S. Cl.
USPC ........................................................... 708/628

(58) Field of Classification Search
None
See application file for complete search history.

(56) References Cited

U.S. PATENT DOCUMENTS

| | | | | |
|---|---|---|---|---|
| 5,268,858 | A * | 12/1993 | Briggs | 708/630 |
| 6,167,422 | A * | 12/2000 | Purcell et al. | 708/628 |
| 6,301,599 | B1 | 10/2001 | Chehrazi et al. | |
| 7,483,935 | B2 * | 1/2009 | Hansen et al. | 708/492 |
| 8,195,735 | B2 * | 6/2012 | Hansen et al. | 708/607 |
| 2007/0174379 | A1 * | 7/2007 | Dockser et al. | 708/625 |
| 2013/0159367 | A1 * | 6/2013 | Dubrovin et al. | 708/209 |

OTHER PUBLICATIONS

K. Babulu et al., "FPGA Realization of Radix-4 Booth Multiplication Algorithm for High Speed Arithmetic Logics," Int'l Journal of Computer Science and Information Technologies, vol. 2, No. 5, 2011, pp. 2102-2107.
Zheng Li et al., "Research on the Disposal of Negative Partial Product for Booth Algorithm," 2010 IEEE Conference on Information Theory and Information Security, 2010, pp, 1115-1117.
Yajuan He et al., "A New Redundant Binary Booth Encoding for Fast 2n-Bit Multiplier Design," IEEE Trans. on Circuits and Systems, vol. 56, No. 6, Jun. 2009, pp. 1192-1201.
C.N. Marimuthu et al., "Low Power High Performance Multiplier," ICGST-PDCS, vol. 8, Issue 1, Dec. 2008, pp. 31-38.
Andrew D. Booth, "A Signed Binary Multiplication Technique," Quart. Journal Mech. and Applied Math, vol. IV, Pt. 2, 1951, pp. 236-240.

* cited by examiner

*Primary Examiner* — David H Malzahn
(74) *Attorney, Agent, or Firm* — Daniel J Santos; Smith Risley Tempel Santos LLC

(57) ABSTRACT

A multiplier circuit for generating a product of at least first and second multiplicands includes encoding circuitry comprising a plurality of encoders. Each of the encoders is operative to receive at least a subset of bits of the first multiplicand and to generate a partial product corresponding to the subset of bits of the first multiplicand. The encoding circuitry is further operative to incorporate a negation of the product as a function of at least a first control signal supplied to the multiplier circuit. The multiplier circuit further includes summation circuitry coupled with the encoding circuitry. The summation circuitry is operative to sum each of the partial products generated by the encoding circuitry to thereby generate the product without performing post-incrementation.

20 Claims, 3 Drawing Sheets

100

200

IMPLEMENTATION OF NEGATION IN A MULTIPLICATION OPERATION WITHOUT POST-INCREMENTATION

FIELD OF THE INVENTION

The present invention relates generally to the electrical, electronic, and computer arts, and more particularly relates to techniques for efficient implementation of mathematical operations.

BACKGROUND

Many electrical, electronic, and computer-related applications, such as, for example, modern digital signal processing, rely heavily on mathematical calculations, and the multiplication operation represents a significant portion of those calculations. In many instances, a digital multiplier is universally utilized as an arithmetic unit in microprocessors, digital signal processors (DSPs), emerging media processors, and the like. These multipliers are used to perform various functions, including, but not limited to, address generation, fast Fourier transformations (FFTs), discrete cosine transformations (DCTs), etc. Consequently, multipliers play a critical role in processing multimedia and other data.

With the ever increasing amounts data that must be processed, it is necessary that the multiplication operation be as fast as possible. Unfortunately, however, multiplication is an inherently slow operation, particularly in the context of digital signal processing, wherein such multiplication operations are required to be implemented by instructions supported by modern DSP cores and other arithmetic logic units (ALUs). In contrast to simple addition, multiplication requires that each digit of the multiplicand be multiplied by each digit of the multiplier to arrive at the partial products. These partial products must be subsequently added together to generate a final result. Moreover, many mathematical operations use a negated result of the multiplication.

Implementing a negative multiplication function in an ALU (e.g., a DSP core) generally requires negation of the multiplication result in two's complement number representation. In two's complement number representation, a negation involves performing a bitwise NOT operation followed by an increment of the result by one. The increment by one operation can sometimes be incorporated into other addition logic, which makes the control logic used to implement the process more complex. In other cases, the increment by one operation may require separate dedicated circuitry, such as, for example, incrementer logic, which is relatively large in terms of integrated circuit (IC) area. In either case, the required additional circuitry increases IC area utilization and power consumption, and is therefore undesirable.

SUMMARY

Embodiments of the present invention provide techniques for advantageously implementing a multiplication function which involves negation of the multiplication result, without the need for a post-incrementation operation. Conventional means for implementing multiplication with negation typically require additional circuitry (e.g., an incrementer) for incrementing the multiplication result by one, which substantially increases IC area utilization and power consumption, among other disadvantages. Moreover, for applications which require performing several concurrent multiplication operations, area utilization and power consumption in the IC increases even more dramatically. Accordingly, by eliminating the need for post-incrementation, aspects of the invention beneficially reduce IC size and power consumption.

In accordance with an embodiment of the invention, a multiplier circuit for generating a product of at least first and second multiplicands includes encoding circuitry comprising a plurality of encoders. Each of the encoders is operative to receive at least a subset of bits of the first multiplicand and to generate a partial product corresponding to the subset of bits of the first multiplicand. The encoding circuitry is further operative to incorporate a negation of the product as a function of at least a first control signal supplied to the multiplier circuit. The multiplier circuit further includes summation circuitry coupled with the encoding circuitry. The summation circuitry is operative to sum each of the partial products generated by the encoding circuitry to thereby generate the product without performing post-incrementation.

In accordance with another embodiment of the invention, a method for generating a product of at least first and second multiplicands includes the steps of: generating a plurality of partial products, each partial product corresponding to a given one of a plurality of subsets of bits of the first multiplicand, the partial products incorporating a negation of the product as a function of at least a first control signal; and summing each of the partial products to thereby generate the product without performing post-incrementation.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals indicate corresponding elements throughout the several views, and wherein.

DETAILED DESCRIPTION OF PREFERRED EMBODIMENTS

The present invention, according to aspects thereof, will be described herein in the context of illustrative methods and circuits for performing negation in a multiplication operation using Booth encoding, without the necessity of performing a post-incrementation on the multiplication result. It should be understood, however, that the present invention is not limited to these or any other particular methods and circuit arrangements. Rather, the invention is more generally applicable to techniques for more efficiently performing negation in a multiplication operation in such a way that design complexity, IC layout area penalty, and power consumption are significantly reduced compared to conventional approaches, among other important advantages. To accomplish this, embodiments of the invention incorporate a negation of the multiplication result into the multiplier itself. In this manner, the need for performing a post-incrementation operation on the multiplication result, which is a significant source of power and area consumption in an IC, is beneficially eliminated. Moreover, it will become apparent to those skilled in the art given the teachings herein that numerous modifications can be made to the embodiments shown that are within the scope of the present invention. That is, no limitations with respect to the specific embodiments described herein are intended or should be inferred.

Figure 1:
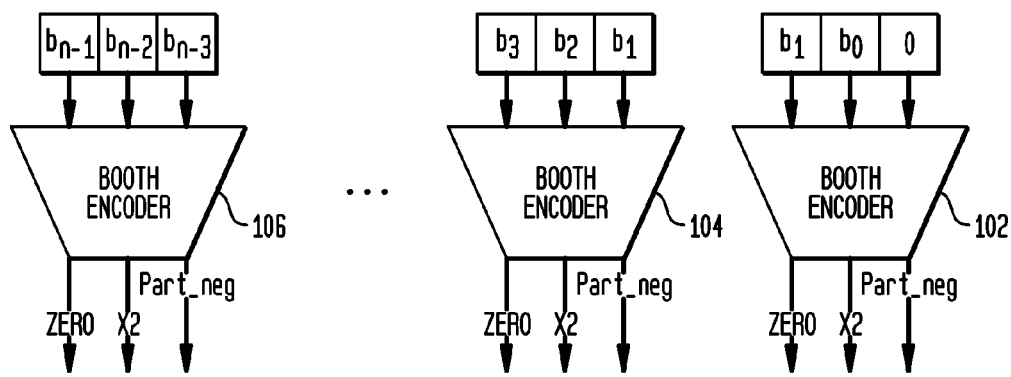
FIG. 1 is a block diagram depicting at least a portion of an exemplary radix-four multiplier circuit which can be modified to implement techniques of the present invention.

FIG. 1 is a block diagram depicting at least a portion of an exemplary multiplier circuit 100 which can be modified to implement techniques of the present invention. Multiplier circuit 100 uses a radix-4 Booth encoding scheme. The Booth multiplication algorithm was first proposed by Andrew D. Booth in 1951 (see Andrew D. Booth, "A Signed Binary Multiplication Technique," *Quarterly Journal of Mechanics and Applied Mathematics*, Vol. IV, Pt. 2 (1951), the disclosure of which is incorporated herein by reference in its entirety). The Booth multiplication algorithm takes advantage of the fact that partial product generation is a highly repetitive process, and that it is faster for a processor to perform shifting than it is to perform addition.

As set forth in his paper, Booth's multiplication algorithm involves repeatedly adding one of two predetermined values A and S to a product P, and then performing a rightward arithmetic shift on P. More particularly, consider a multiplicand M and a multiplier R; and let i and j be integers indicative of the number of bits in M and R, respectively. Rather than using the terms "multiplicand" and "multiplier," the terms "first multiplicand" and "second multiplicand," respectively, may be used interchangeably herein, since multiplication is commutative. Booth's algorithm is implemented as follows:

1. Compute the values of A and S, and an initial value for product P. All of these numbers should have a length equal to i+j+1.
    a) For computing A, fill most significant bit (MSB) locations (leftmost) with the value of M; fill the remaining (j+1) bits with zeros.
    b) For computing S, fill the MSB locations with the value of −M in two's complement representation; fill the remaining (j+1) bits with zeros.
    c) For computing P, fill the most significant i bits with zeros. To the right of this, append the value of R (the next j bits). Fill the least significant bit (LSB) location with a zero.
2. Determine the two least significant (rightmost) bits of P.
    a) For 01, compute the value P+A, ignoring any overflow.
    b) For 10, compute the value P+S, ignoring any overflow.
    c) For 00 or 11, take no action; use P directly in the next step.
3. Arithmetically shift the value obtained in step 2 rightward by one bit position. Set P equal to this new value.
4. Repeat steps 2 and 3 above until they have been performed j times.
5. Drop the least significant bit from P to obtain the final product of M and R.

Booth multiplication is a technique that allows for smaller, faster multiplication circuits, by recoding the numbers that are multiplied. In a radix-4 Booth encoding scheme, the number of partial products is reduced by half. The basic idea is that, rather than shifting and adding for every column of the multiplier term and multiplying by one or zero, we only take the overlapping bit triplets of one multiplier term and then multiply the other multiplier term by −1, −2, 0, +1, or +2 to obtain the same result.

The multiplier is evaluated, three bits at a time (i.e., as a block), and a possible outcome for the partial product is generated for that block of three bits. All groups of three bits are evaluated in parallel. Grouping starts from the LSB, and the first block uses only two bits of the multiplier. Table 1 below illustrates a truth table corresponding to a radix-4 Booth encoding methodology for evaluating three consecutive bits, $b_{2j-1}$, $b_{2j}$ and $b_{2j+1}$, of the multiplier, where j is an integer indicative of a partial product index. Here, the subscript j is multiplied by two to ensure that adjacent groups of three bits have one overlapping bit. Operations performed on the multiplicand for each combination of input bit values are shown in Table 1.

TABLE 1

| Inputs | | | |
|---|---|---|---|
| $b_{2j+1}$ | $b_{2j}$ | $b_{2j-1}$ | Function |
| 0 | 0 | 0 | 0 |
| 0 | 0 | 1 | +A |
| 0 | 1 | 0 | +A |
| 0 | 1 | 1 | +2A |
| 1 | 0 | 0 | −2A |
| 1 | 0 | 1 | −A |
| 1 | 1 | 0 | −A |
| 1 | 1 | 1 | 0 |

Thus, when the multiplier bits $b_{2j}$, $b_{2j-1}$ and $b_{2j+1}$ are either all 0 or all 1, the multiplicand (A) is multiplied by 0. When bit $b_{2j+1}$ is 1 and bits $b_{2j}$ and $b_{2j-1}$ are different, the multiplicand is multiplied by −1. When bit $b_{2j+1}$ is 1 and bits $b_{2j}$ and $b_{2j-1}$ are 0, the multiplicand is multiplied by −2. When bit $b_{2j+1}$ is 0 and bits $b_{2j}$ and $b_{2j-1}$ are different, the multiplicand is multiplied by +1. And when bit $b_{2j+1}$ is 0 and bits $b_{2j}$ and $b_{2j-1}$ are 1, the multiplicand is multiplied by +2.

In multiplier circuit 100, radix-4 Booth encoding is implemented in each of a plurality of Booth encoders 102, 104 and 106. Each Booth encoder is adapted to receive, as inputs, three bits of the multiplicand, $b_{2i}$, $b_{2i-1}$ and $b_{2i+1}$, where 0≤i<n/2 is an integer and n is a number of bits in the multiplicand. Here, as stated above, the subscript i is multiplied by two to ensure that adjacent groups of three bits have one overlapping bit. For example, radix-4 Booth encoder 102 is operative to receive the multiplicand bits $b_{-1}$, $b_0$ and $b_1$, wherein the LSB ($b_{-1}$) of the multiplicand is set to zero. Likewise, Booth encoder 104 is adapted to receive multiplicand bits $b_1$, $b_2$ and $b_3$; and Booth encoder 106 is adapted to receive multiplicand bits $b_{n-3}$, $b_{n-2}$ and $b_{n-1}$, where n is an integer indicative of the overall number of bits in the multiplicand. Thus, the Booth encoders are configured such that at least one multiplicand bit (e.g., $b_1$) is overlapped between two adjacent Booth encoders (e.g., 102 and 104).

Each Booth encoder 102, 104 and 106 preferably generates three output signals; namely, Zero, X2 and Part_neg. A logic state of signal Zero is indicative of whether or not the corresponding partial product should be zeroed. A logic state of signal X2 is indicative of whether or not the multiplicand should be multiplied by two (i.e., shifted left by one bit). A logic state of signal Part_neg is indicative of whether or not the partial product should be negated. Negation of a partial product can be performed by inverting the bits of the partial product and by adding one to the LSB of the partial product. The corresponding ones of all negated partial products can be combined together to form a separate partial product.

The partial products generated by the Booth encoders 102, 104 and 106 are shifted, sign extended and then summed together to obtain the resulting multiplication product. More particularly, the partial product generated by Booth encoder 102 is shifted left by 0 bits; the partial product generated by Booth encoder 104 is shifted left by 2 bits; the partial product generated by Booth encoder 106 is shifted left by 4 bits; and so on. The shifted and sign extended partial products are summed together to calculate the final multiplication result.

Figure 2:
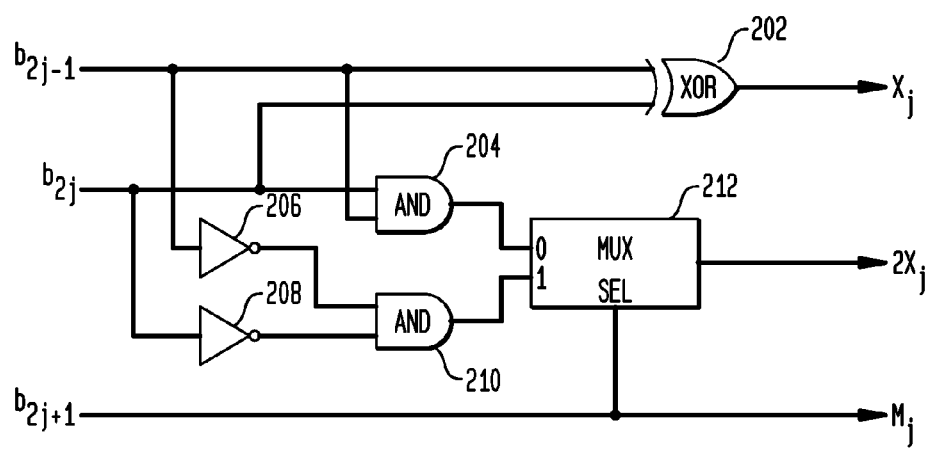
FIG. 2 is a schematic diagram depicting at least a portion of an exemplary encoder circuit which may be employed in a given one of the Booth encoders in the illustrative multiplier circuit shown in FIG. 1.

FIG. 2 is a schematic diagram depicting at least a portion of an exemplary Booth encoder circuit 200 which may be employed in a given one of the Booth encoders in the illustrative multiplier circuit 100 shown in FIG. 1, according to an alternative embodiment of the invention. Encoder circuit 200 is preferably adapted to receive three adjacent bits of the multiplicand, $b_{2j-1}$, $b_{2j}$ and $b_{2j+1}$, and is operative to generate three output signals, $X_j$, $2X_j$ and $M_j$, where j is an integer indicative of a partial product index (j-th partial product). Bits $b_{2j-1}$, $b_{2j}$ and $b_{2j+1}$ define the calculation of the j-th partial product. Output signals, $X_j$, $2X_j$ and $M_j$, generated by the Booth encoder circuit 200, as well as operations performed on the multiplicand for each combination of input bit values, are shown in Table 2 below.

TABLE 2

| Inputs | | | | Outputs | | |
|---|---|---|---|---|---|---|
| $b_{2j+1}$ | $b_{2j}$ | $b_{2j-1}$ | Function | $X_j$ | $2X_j$ | $M_j$ |
| 0 | 0 | 0 | 0 | 0 | 0 | 0 |
| 0 | 0 | 1 | +A | 1 | 0 | 0 |
| 0 | 1 | 0 | +A | 1 | 0 | 0 |
| 0 | 1 | 1 | +2A | 0 | 1 | 0 |
| 1 | 0 | 0 | −2A | 0 | 1 | 1 |
| 1 | 0 | 1 | −A | 1 | 0 | 1 |
| 1 | 1 | 0 | −A | 1 | 0 | 1 |
| 1 | 1 | 1 | 0 | 0 | 0 | 1 |

In FIG. 2, the inputs are $b_{2j-1}$, $b_{2j}$ and $b_{2j+1}$, which represent adjacent bits of the multiplicand. Bit $b_{2j-1}$ is supplied to a first input of an exclusive-OR (XOR) logic gate 202 and bit $b_{2j}$ is supplied to a second input of the XOR gate. An output of the XOR gate 202 is operative to generate output signal $X_j$ of the encoder circuit 200. Bits $b_{2j-1}$ and $b_{2j}$ are also supplied to first and second inputs, respectively, of a first AND logic gate 204. A logical complement of bit $b_{2j-1}$, which may be generated by a first inverter gate 206, is preferably supplied to a first input of a second AND logic gate 210, and a logical complement of bit $b_{2j}$, which may be generated by a second inverter gate 208, is supplied to a second input of the second AND gate.

The respective outputs generated by AND gates 204 and 210 are supplied to the data inputs of a multiplexer (MUX) 212. Specifically, the output of AND gate 204 is supplied to a first data input ("0" input) of the MUX 212, and the output of AND gate 210 is supplied to a second data input ("1" input) of the MUX. Bit $b_{2j+1}$ is supplied to the MUX 212 and is used as a control signal to select which one of the data inputs (0 or 1) is to be passed to an output of the MUX as signal $2X_j$. Bit $b_{2j+1}$ is also used as the output signal $M_j$. Thus, when bit $b_{2j+1}$ is a logic low ("0") level, the output of AND gate 204 is selected as output signal $2X_j$, and when bit $b_{2j+1}$ is a logic high ("1") level, the output of AND gate 210 is selected as output signal $2X_j$.

In comparison to the outputs Part_neg, X2 and Zero generated by each of the respective Booth encoders 102, 104, 106 in the illustrative multiplier circuit 100 shown in FIG. 1, the outputs $X_j$, $2X_j$ and $M_j$ generated by the encoder circuit 200 are very similar. Specifically, in the Booth encoders in multiplier circuit 100, the second multiplicand is taken as is to a partial product when the Zero and X2 signals are set to 0. Alternatively, in encoder circuit 200, the partial product is set to 0 when the $X_j$ and $2X_j$ outputs are set to 0. Accordingly, it will be understood by those skilled in the art that the illustrative encoder circuit 200 can be easily modified to generate the output signals Part_neg, X2, and Zero, for use in the multiplier circuit 100 shown in FIG. 1, and vice versa.

As previously stated, one disadvantage of this approach in the handling of negation of the final multiplication result in two's complement representation is that it requires a bitwise logical inversion (NOT operation) followed by an increment of the result by one. The addition circuitry required to implement this increment by one operation is relatively large. Thus, to handle negation of the final multiplication result in a multiplication operation using a standard approach results in a significant IC chip area and power consumption penalty.

Aspects of the present invention incorporate a negation of the multiplication result into the multiplier in a manner which beneficially eliminates the need to increment the multiplication result by one, thereby saving considerable IC area and power consumption, since the adder represents a relatively large portion of the overall chip area and power consumption in conventional multiplier circuits. To accomplish this, one embodiment of the invention comprises a multiplier adapted to receive at least one additional control signal, Result_neg, which is indicative of whether or not the multiplication result requires negation. For example, when the signal Result_neg is asserted (e.g., logic "1"), the result is to be negated, and when Result_neg is de-asserted (e.g., logic "0"), the result is not negated. Negation can be performed in various ways, in accordance with techniques of the invention.

Figure 3:
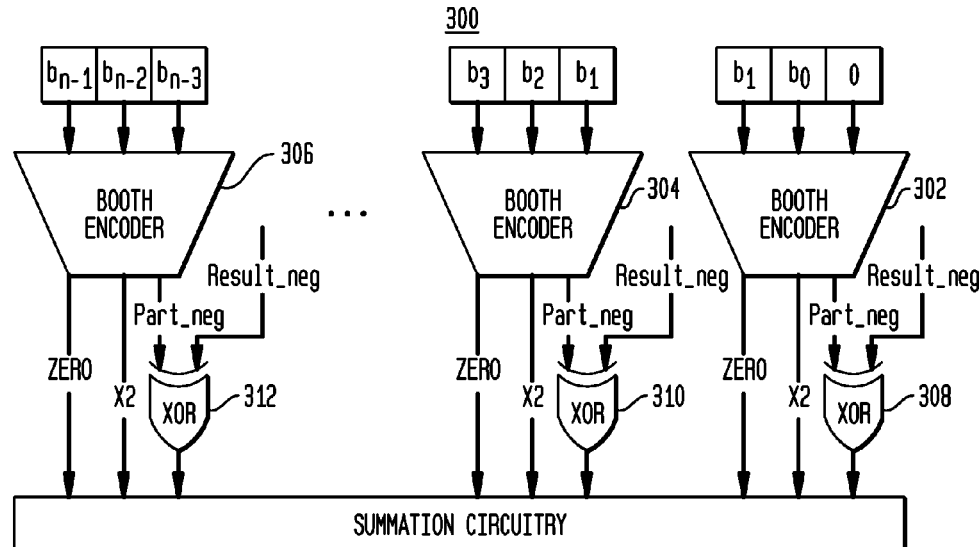
FIG. 3 is a block diagram depicting at least a portion of an exemplary radix-four multiplier circuit, according to an embodiment of the present invention.

By way of example only and without loss of generality, FIG. 3 is a block diagram depicting at least a portion of an exemplary multiplier circuit 300, according to an embodiment of the invention. Multiplier circuit 300 employs radix-4 Booth encoding, implemented in each of a plurality of Booth encoders 302, 304 and 306. It is to be understood, however, that the invention is not limited to radix-4 Booth encoding and that other encoding methodologies having different radices (e.g., radix-8, etc.) can be employed in accordance with other embodiments of the invention, as will become apparent to those skilled in the art given the teachings herein.

With continued reference to FIG. 3, each Booth encoder is adapted to receive, as inputs, a bit, $b_{2i}$ of the multiplicand and two bits, $b_{2i-1}$ and $b_{2i+1}$, of the multiplicand that are adjacent to bit $b_{2i}$, where i is an integer. More particularly, Booth encoder 302 is operative to receive the multiplicand bits $b_{-1}$, $b_0$ and $b_1$, where the LSB ($b_{-1}$) of the multiplicand is set at zero. Similarly, Booth encoder 304 is operative to receive multiplicand bits $b_1$, $b_2$ and $b_3$; and Booth encoder 306 is operative to receive multiplicand bits $b_{n-3}$, $b_{n-2}$ and $b_{n-1}$, where n is an integer greater than one and (n−1) is indicative of the overall number of bits in the multiplicand. Thus, the Booth encoders are configured such that at least one multiplicand bit (e.g., $b_2$) is overlapped between two adjacent Booth encoders (e.g., 102 and 104).

Each of the Booth encoders 302, 304 and 306 is operative to generate three output signals; namely, Zero, X2 and Part_neg. A logic state of signal Zero is indicative of whether or not the corresponding partial product should be zeroed; a logic state of signal X2 is indicative of whether or not the multiplicand should be multiplied by two (i.e., shifted left by one bit); and a logic state of signal Part_neg is indicative of whether or not the corresponding partial product should be negated. Rather than being directly used by subsequent multiplier circuitry, as in the case of multiplier circuit 100 shown in FIG. 1, the Part_neg signal generated by each of the Booth encoders is preferably exclusive-ORed with the Result_neg signal supplied to the multiplier.

Specifically, the Part_neg signal generated by Booth encoder 302 is preferably fed to a first input of a first exclusive-OR (XOR) logic gate 308. The Result_neg signal, which in this embodiment is identical for all Booth encoding stages in multiplier circuit 300, is fed to a second input of XOR gate 308. Likewise, the Part_neg signal generated by Booth encoder 304 is preferably fed to a first input of a second XOR logic gate 310. The Result_neg signal is fed to a second input of XOR gate 310. The Part_neg signal generated by Booth encoder 306 is preferably fed to a first input of a final (e.g., (n−1)th) XOR logic gate 312. The Result_neg signal is fed to a second input of XOR gate 312.

It is to be understood that the number of Booth encoders used in the multiplier circuit 300, while not limited by the invention, will be dependent upon the number of bits in the multiplicand. In general, for an n-bit multiplicand, n/2 Booth encoders are preferably employed.

Output signals generated by each of the respective Booth encoders 302, 304 and 306 and corresponding XOR gates 308, 310 and 312 are then supplied to subsequent summation circuitry 314, or alternative control and/or processing circuitry, in multiplier circuit 300 for generating the final product result. Summation circuitry 314 may comprise, for example, a combination of one or more full adders, half adders, carry look-ahead adders, Wallace tree reduction circuitry, multiplexers, etc. (not explicitly shown).

As described above, the inputs to the respective Booth encoders 302, 304, 306 are supplied from corresponding bit positions of a first one of at least two multiplicands. Based on the output signals generated by the Booth encoders, partial products are formed from a second of the two multiplicands. Thus, Booth encoder 302 with inputs comprising bits $b_0$ and $b_1$ of the first multiplicand generates a partial product based on the second multiplicand as is (i.e., unshifted). Booth encoder 304 with inputs comprising bits $b_1$, $b_2$ and $b_3$ of the first multiplicand generates a partial product based on the second multiplicand shifted left (i.e., towards the most significant bit position) by two bits. Likewise, a Booth encoder (not explicitly shown) with inputs comprising bits $b_3$, $b_4$ and $b_5$ of the first multiplicand generates a partial product based on the second multiplicand shifted left by four bits, and so on. In the general case, Booth encoder 306 with inputs comprising bits $b_{n-3}$, $b_{n-2}$ and $b_{n-1}$ of the first multiplicand generates a partial product based on the second multiplicand shifted left by (n−2) bits. In general, the inputs to the Booth encoder are bits $b_{2i-1}$, $b_{2i}$ and $b_{2i+1}$, and the corresponding partial product is shifted left by 2i bits, where i is an integer corresponding to a given Booth encoder and which is different for each Booth encoder.

Results of the respective Booth encoding stages, comprising Booth encoders 302, 304 and 306, are used by summation circuitry 314 in generating the final multiplication result. More particularly, each Booth encoder accepts 3 bits, $b_{2i-1}$, $b_{2i}$ and $b_{2i+1}$, of a first multiplicand (e.g., A in the case of A×B multiplication) and controls one partial product. If the Zero signal is set to "1," then the corresponding partial product is zeroed. If the X2 signal is set to "1," then the corresponding partial product is set to a second multiplicand (e.g., B in the case of A×B multiplication) shifted left by one bit. If the Part_neg signal or Part_neg exclusive-ORed with the Result_neg signal is set to "1," then the corresponding partial product is set to −B (which may be shifted left by one bit, depending on the value of X2). After completing all of these shifts and/or negations, the corresponding partial product is shifted left by 2i bits, where i is an integer corresponding to a given Booth encoder, and is sign extended. To obtain the final multiplication result (A×B), all the partial products are summed together by the summation circuitry 314, which may comprise essentially any circuit capable of performing a summation function, as previously stated.

Figure 4:
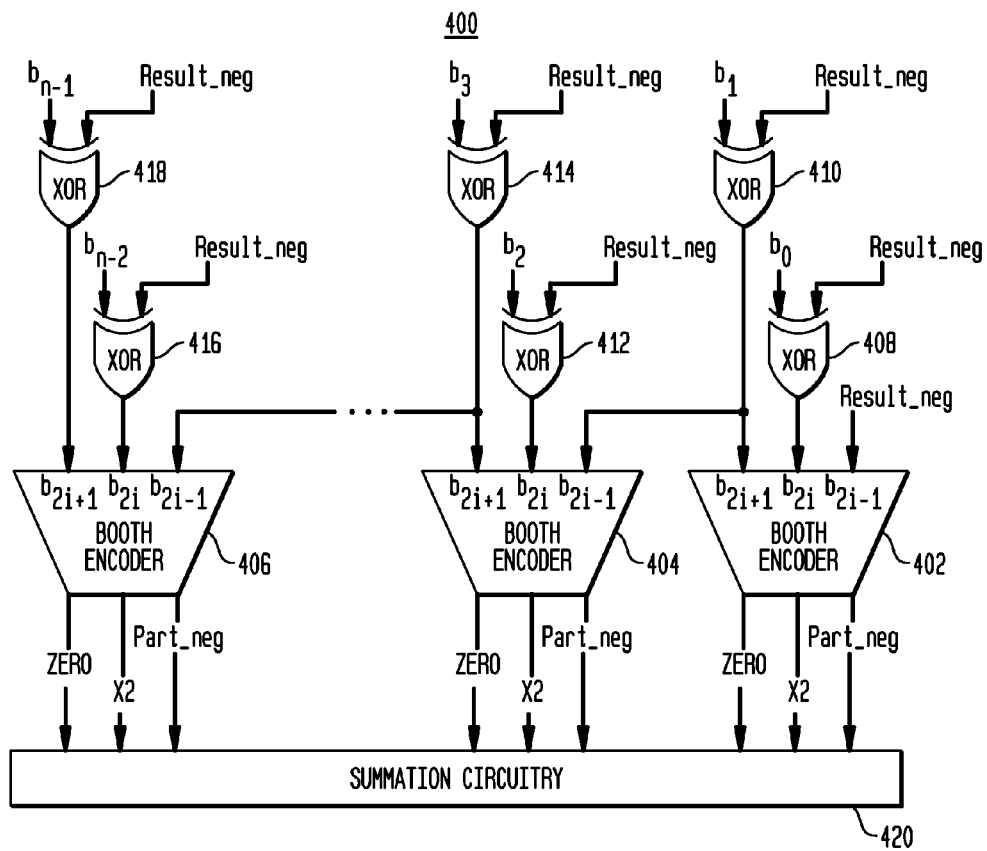
FIG. 4 is a block diagram depicting at least a portion of an exemplary radix-four multiplier circuit, according to another embodiment of the present invention.

FIG. 4 is a block diagram depicting at least a portion of an exemplary multiplier circuit 400, according to another embodiment of the invention. Multiplier circuit 400 employs radix-4 Booth encoding, implemented in each of a plurality of Booth encoders 402, 404 and 406. It is to be understood, however, that the invention is not limited to radix-4 Booth encoding and that other Booth encoding methodologies having different radices (e.g., radix-8, etc.) can be employed in accordance with other embodiments of the invention, as will become apparent to those skilled in the art given the teachings herein. Booth encoders 402, 404 and 406 may be implemented in a manner consistent with an implementation of Booth encoders 302, 304 and 306 shown in FIG. 3.

Each Booth encoder is adapted to receive three input signals derived from a corresponding subset of multiplicand bits. The term "subset" as used herein is intended to refer broadly to a bit, $b_{2i}$ of the multiplicand and two bits, $b_{2i-1}$ and $b_{2i+1}$, of the multiplicand that are adjacent to bit $b_{2i}$, where i is an integer. Here, as stated above, the subscript i is multiplied by two to ensure that subsets of three bits between adjacent Booth encoders have one overlapping bit. Each Booth encoder is further operative to generate three output signals; namely, Zero, X2 and Part_neg. A logic state of signal Zero is indicative of whether or not the corresponding partial product should be zeroed; a logic state of signal X2 is indicative of whether or not the multiplicand should be multiplied by two (i.e., shifted left by one bit); and a logic state of signal Part_neg is indicative of whether or not the corresponding partial product should be negated. Rather than being exclusive-ORed with the Result_neg signal supplied to the multiplier, as in the case in multiplier circuit 300 shown in FIG. 3, the Part_neg signal is directly used by subsequent multiplier circuitry, and respective subsets of the multiplicand bits are instead exclusive-ORed with the Result_neg signal prior to being supplied to the Booth encoders.

Specifically, a first XOR gate 408 is adapted to receive the Result_neg signal at a first input thereof and to receive multiplicand bit $b_0$ at a second input thereof. An output signal generated by XOR gate 408 is supplied to bit position $b_{2i}$ of Booth encoder 402. A second XOR gate 410 is adapted to receive the Result_neg signal at a first input thereof and to receive multiplicand bit $b_1$ at a second input thereof. An output signal generated by XOR gate 410 is supplied to bit position $b_{2i+1}$ of Booth encoder 402. Booth encoder 402 is adapted to directly receive the Result_neg signal at bit position $b_{2i-1}$ thereof. Similarly, a third XOR gate 412 is adapted to receive the Result_neg signal at a first input thereof and to receive multiplicand bit $b_2$ at a second input thereof. An output signal generated by XOR gate 412 is supplied to bit position $b_{2i}$ of Booth encoder 404. A fourth XOR gate 414 is adapted to receive the Result_neg signal at a first input thereof and to receive multiplicand bit $b_3$ at a second input thereof. An output signal generated by XOR gate 414 is supplied to bit position $b_{2i+1}$ of Booth encoder 404. Booth encoder 404 is adapted to receive the output signal generated by XOR gate 410 of the adjacent subset of multiplicand bits. A fifth XOR gate 416 is adapted to receive the Result_neg signal at a first input thereof and to receive multiplicand bit $b_{n-2}$ at a second input thereof. An output signal generated by XOR gate 416 is supplied to bit position $b_{2i}$ of Booth encoder 406. A sixth XOR gate 418 is adapted to receive the Result_neg signal at a first input thereof and to receive multiplicand bit $b_{n-1}$ at a second input thereof. An output signal generated by XOR gate 418 is supplied to bit position $b_{2i+1}$ of Booth encoder 406. Booth encoder 406 is adapted to receive an output signal generated by an XOR gate (e.g., XOR gate 414) of an immediately adjacent subset of multiplicand bits. As in the case for illustrative multiplier 300 depicted in FIG. 3, the Booth encoders 402, 404 and 406 are configured such that at least one multiplicand bit (e.g., $b_1$) is overlapped between two adjacent Booth encoders (e.g., 402 and 404).

Output signals generated by each of the respective Booth encoders 402, 404 and 406 control the partial products generation as described above. The partial products are then directly supplied to subsequent summation circuitry 420, or alternative control and/or processing circuitry, in multiplier circuit 400 for generating the final product result. Summation circuitry 420 may comprise, for example, a combination of one or more full adders, half adders, carry look-ahead adders, Wallace tree reduction circuitry, multiplexers, etc. (not explicitly shown). Summation circuitry 420 preferably functions in a manner consistent with summation circuitry 314 shown in FIG. 3 and described above.

In comparing the illustrative embodiments shown in FIGS. 3 and 4, multiplier circuit 300 requires fewer gates, and thereby represents a more compact design. As a trade-off, however, multiplier circuit 400 requires less modification to a standard multiplier circuit, which may be beneficial in certain applications, particularly since an XOR gate is relatively small in terms of overall chip area.

As previously stated, the invention is not limited to a multiplier operative to perform radix-4 Booth encoding. For example, techniques of the invention described herein can be employed with a radix-8 Booth encoding scheme. Using radix-8 Booth encoding, the multiplier is partitioned into y slices (i.e., subsets) of four bits (rather than slices of three bits for radix-4 Booth encoding), which results in the following decomposition:

$$y = \Sigma 2^{3i} \eta_i,$$

where $\eta_i$ represents an encoding of the ith slice. In comparison to a radix-4 Booth encoding scheme, while the number of terms of the above decomposition is only ⅓, rather than ½, of the width of y, the range of encodings is $-4 \leq \eta_i \leq 4$, and therefore the value of each term is no longer guaranteed to be a power of two in absolute value. Thus, a multiplier based on a radix-8 encoding scheme generates fewer partial products than a radix-4 multiplier, but the computation of each partial product is more complex.

Each radix-8 Booth encoder is adapted to receive four inputs, and thereby evaluate a subset of four bits of the multiplicand at a time. Additionally, each radix-8 Booth encoder generates five output signals, Zero, X2, X3, X4 and Part_neg, where Zero, X2 and Part_neg are the same as for a radix-4 encoder, X3 is indicative of whether or not the corresponding partial product should be multiplied by three, and X4 is indicative of whether or not the corresponding partial product should be multiplied by four (i.e., shifted left by two bits). According to techniques of the invention, the Part_neg output signal can be exclusive-ORed with the Result_neg signal prior to being supplied to subsequent summation circuitry (e.g., in a manner consistent with the illustrative topology shown in FIG. 3), or each bit input to each of the Booth encoders can be exclusive-ORed with the Result_neg signal (e.g., in a manner consistent with the illustrative topology shown in FIG. 4).

The choice between radix-8 and radix-4 multiplication is generally decided by timing requirements of a hardware design used to implement the encoding methodology. In a standard implementation, partial products are computed in one clock cycle (i.e., clock period) and a compression tree is executed in the next cycle. If there is sufficient time during the first clock cycle to perform the addition required for radix-8 encoding, then this scheme is feasible. Since a significant portion of the silicon area allocated to a multiplier is associated with the compression tree, the resulting reduction in the number of partial products may represent a gain in efficiency in certain applications.

Figure 5:
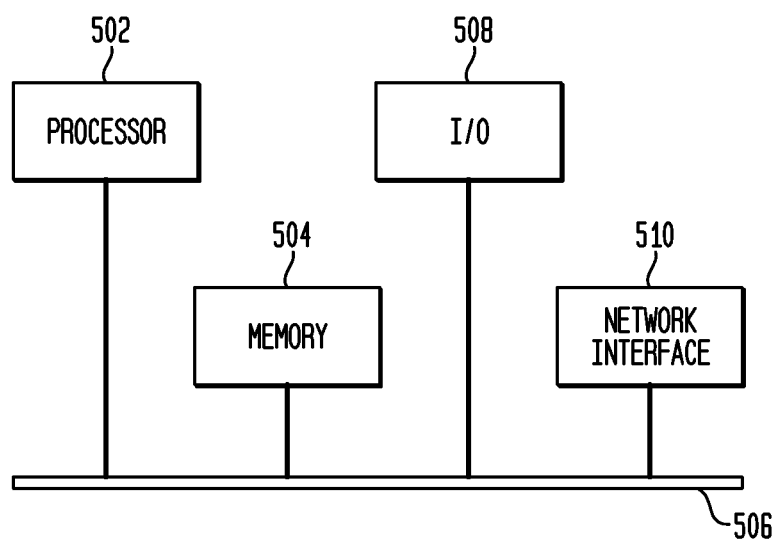
FIG. 5 is a block diagram depicting an exemplary system in which aspects of the present invention can be implemented, according to an embodiment of the invention.

Methodologies according to embodiments of the present invention may be particularly well-suited for implementation in an electronic device or alternative system, such as, for example, a microprocessor or other processing device/system. By way of illustration only, FIG. 5 is a block diagram depicting an exemplary data processing system 500, formed in accordance with an aspect of the invention. System 500 may represent, for example, a general purpose computer or other computing device or systems of computing devices which, when programmed according to embodiments of the invention, become a specialized device operative to perform techniques of the invention. System 500 may include a processor 502, memory 504 coupled with the processor, as well as input/output (I/O) circuitry 508 operative to interface with the processor. The processor 502, memory 504, and I/O circuitry 508 can be interconnected, for example, via a bus 506, or alternative connection means, as part of the data processing system 500. Suitable interconnections, for example via the bus, can also be provided to a network interface 510, such as a network interface card (NIC), which can be provided to interface with a computer or Internet Protocol (IP) network, and to a media interface, such as a diskette or CD-ROM drive, which can be provided to interface with media. The processor 502 may be configured to perform at least a portion of the methodologies of the present invention, illustrative embodiments of which have been described above.

It is to be appreciated that the term "processor" as used herein is intended to include any processing device, such as, for example, one that includes one or more processor cores, a central processing unit (CPU) and/or other processing circuitry (e.g., network processor, DSP, microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, one or more output devices (e.g., printer, monitor, etc.) for presenting the results associated with the processor, and/or interface circuitry for operatively coupling the input or output device(s) to the processor.

Accordingly, an application program, or software components thereof, including instructions or code for performing the methodologies of the invention, as described herein, may be stored (in a non-transitory manner) in one or more of the associated storage media (e.g., ROM, fixed or removable storage) and, when ready to be utilized, loaded in whole or in part (e.g., into RAM) and executed by the processor 502. In any case, it is to be appreciated that at least a portion of the components shown in any of FIGS. 1 through 4 may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Any of the exemplary circuits illustrated in FIGS. 1 through 4, or portions thereof, may be part of an integrated circuit. Integrated circuits so manufactured are considered part of this invention.

An integrated circuit in accordance with the present invention can be employed in essentially any application and/or electronic system in which digital multiplication operations are performed. Suitable systems for implementing techniques of the invention may include, but are in no way limited to, personal computers, multimedia processors, DSPs, communication networks, cellular telephones, electronic instruments, etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A multiplier circuit for generating a product of at least first and second multiplicands, the multiplier circuit comprising:
   encoding circuitry including a plurality of encoders, each of the encoders being operative to receive at least a subset of bits of the first multiplicand and to generate a partial product corresponding to the subset of bits of the first multiplicand, the encoding circuitry being further operative to incorporate a negation of the product as a function of at least a first control signal supplied to the multiplier circuit; and
   summation circuitry coupled with the encoding circuitry and operative to sum each of the partial products generated by the encoding circuitry to thereby generate the product without performing post-incrementation.

2. The multiplier circuit of claim 1, wherein the encoding circuitry comprises a plurality of Booth encoders, each of the Booth encoders being operative to receive the subset of bits of the first multiplicand and to generate the partial product corresponding to the subset of bits of the first multiplicand.

3. The multiplier circuit of claim 2, wherein each of at least a subset of the Booth encoders comprises a radix-4 Booth encoder.

4. The multiplier circuit of claim 2, wherein each of at least a subset of the Booth encoders comprises a radix-8 Booth encoder.

5. The multiplier circuit of claim 2, wherein each of the Booth encoders generates at least a first output signal indicative of a corresponding partial product, and wherein the encoding circuitry further comprises a plurality of exclusive-OR logic gates, each exclusive-OR logic gate including a first input coupled with the first output signal of a corresponding one of the Booth encoders, a second input adapted to receive the first control signal, and an output coupled with the summation circuitry and operative to generate a negated partial product signal as a function of the first control signal.

6. The multiplier circuit of claim 5, wherein each of the Booth encoders generates at least second and third output signals, the second output signal being indicative of whether the second multiplicand is to be multiplied by two, the third output signal being indicative of whether the corresponding partial product is to be zeroed.

7. The multiplier circuit of claim 2, wherein the encoding circuitry further comprises a plurality of exclusive-OR logic gates, each of the exclusive-OR logic gates including a first input adapted to receive a corresponding bit of the first multiplicand, a second input adapted to receive the first control signal, and an output coupled with an input of a corresponding one of the Booth encoders and operative to generate a negated bit signal as a function of the first control signal.

8. The multiplier circuit of claim 2, wherein the encoding circuitry further comprises a plurality of exclusive-OR logic gates organized into at least first and second subsets, each exclusive-OR logic gate in the first subset of exclusive-OR logic gates including a first input adapted to receive the first control signal, a second input adapted to receive a corresponding bit, $b_{2j}$, of the first multiplicand, where $0 \leq j \leq n/2$ is an integer and n is a number of bits in the first multiplicand, and an output connected with a corresponding input, $b_{2i}$, of a given Booth encoder, where i is an integer corresponding to the given Booth encoder and which is different for each Booth encoder, each exclusive-OR logic gate in the second subset of exclusive-OR logic gates including a first input adapted to receive the first control signal, a second input adapted to receive a corresponding bit, $b_{2j+1}$, of the first multiplicand, and an output connected with a corresponding input, $b_{2i+1}$, of the given Booth encoder and an input, $b_{2i-1}$, of a Booth encoder adjacent to the given Booth encoder.

9. The multiplier circuit of claim 2, wherein each of the Booth encoders includes at least a first input, $b_{2i-1}$, a second input, $b_{2i}$, and a third input, $b_{2i+1}$, where i is an integer indicative of a partial product index and is different for each of the Booth encoders, the third input of a first one of the Booth encoders being connected with the first input of a second one of the Booth encoders that is adjacent to and immediately succeeds the first one of the Booth encoders, each of at least a portion of the subset of bits of the first multiplicand supplied to the Booth encoders being selectively negated as a function of the first control signal.

10. The multiplier circuit of claim 9, wherein the first input of a first one of the Booth encoders connected with a least significant bit of the first multiplicand is adapted to receive the first control signal.

11. The multiplier circuit of claim 1, wherein the summation circuitry comprises at least one of a plurality of adders and a plurality of multiplexers.

12. The multiplier circuit of claim 1, wherein the summation circuitry comprises at least one processor operative to implement a Wallace tree methodology for generating the product.

13. The multiplier circuit of claim 1, wherein the first control signal is indicative of whether or not the product requires negation.

14. An integrated circuit, comprising at least one multiplier circuit according to claim 1.

15. A method for generating a product of at least first and second multiplicands, the method comprising the steps of:
- providing encoding circuitry including a plurality of encoders;
- generating, using the plurality of encoders, a plurality of partial products, each partial product corresponding to a given one of a plurality of subsets of bits of the first multiplicand, the partial products incorporating a negation of the product as a function of at least a first control signal; and
- summing each of the partial products to thereby generate the product without performing post-incrementation.

16. The method of claim 15, wherein the step of generating the plurality of partial products comprises exclusive-ORing each of the partial products with the first control signal prior to the step of summing the partial products.

17. The method of claim 15, wherein each of the subsets comprises three bits, $b_{2j-1}$, $b_{2j}$, and $b_{2j+1}$, where $0 \leq j \leq n/2$ is an integer and n is a number of bits in the first multiplicand, a least significant bit in a first one of the subsets being the same as a most significant bit in a second one of the subsets immediately preceding the first subset, the method further comprising exclusive-ORing at least one of the bits in each of the subsets of bits of the first multiplicand with the first control signal to generate a plurality of corresponding encoded bits, the plurality of partial products being generated as a function of the plurality of corresponding encoded bits.

18. The method of claim 17, wherein the plurality of corresponding encoded bits is generated by Booth encoding the bits of the first multiplicand.

19. A system for generating a product of at least first and second multiplicands, the system comprising:
- memory; and
- at least one processor connected with the memory, the at least one processor being operative: (i) to generate a plurality of partial products, each partial product corresponding to a given one of a plurality of subsets of bits of the first multiplicand, the partial products incorporating a negation of the product as a function of at least a first control signal; and (ii) to sum each of the partial products to thereby generate the product without performing post-incrementation.

20. The system of claim 19, wherein the at least one processor is further operative to exclusive-OR each of the partial products with the first control signal prior to summing the partial products.

* * * * *